United States Patent Office 3,217,007
Patented Nov. 9, 1965

3,217,007
HALO- AND NITRO-SUBSTITUTED PHENETHYL-2-METHYL TETRAHYDROISOQUINOLINES
Arnold Brossi and Hans Bruderer, Riehen, Switzerland, assignors to Hoffmann-La Roche Inc., Nutley, N.J., a corporation of New Jersey
No Drawing. Filed Dec. 31, 1962, Ser. No. 248,204
Claims priority, application Switzerland, Jan. 19, 1962, 650/62
9 Claims. (Cl. 260—287)

This invention relates, in general, to novel tetrahydroisoquinoline compounds and to a process for producing same. More particularly, the invention relates to tetrahydroisoquinoline compounds having the formula:

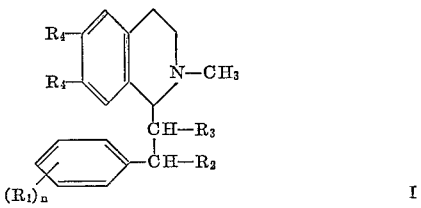

in which $n$ is the integer 1, 2 or 3; $R_1$ represents a halogen atom; $R_2$ is hydrogen or a lower alkyl group; $R_3$ is hydrogen or a lower alkyl group; and in which one of the two groups represented by the symbol $R_4$ is a methoxy group, while the other group represented by the symbol $R_4$ is a hydroxy group. Where the symbol $n$ represents the integer 1, the symbol $R_1$ represents a nitro group as well as a halogen atom.

Additionally, this invention relates to salts of the compounds of Formula I with medicinally acceptable acids, as well as to processes for the production of the bases and salts.

Moreover, the present invention includes ethers and esters of the compounds of Formula I, such ethers and esters having the formula:

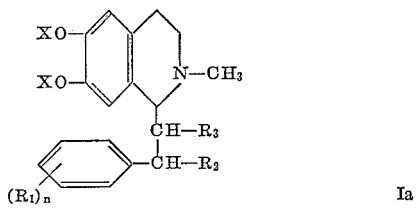

in which the symbols $R_1$, $R_2$, $R_3$ and $n$ have the same meanings as set forth in Formula I. The symbol X, which appears in Formula Ia, represents methyl, a lower alkyl, alkenyl, alkynyl or acyl group with the proviso, however, that one of the groups represented by the symbol X is a methyl group, as well as salts of such ethers and esters with medicinally acceptable acids. The processes by which these ethers and esters, and salts thereof, are prepared is also a part of this invention.

The esters of Formula Ia can be obtained by replacing the hydrogen atom of the hydroxyl group of a Formula I compound with an acyl radical. As used herein, the term "acyl" includes alkanoyl groups, such as, acetyl, propionyl, butyryl, etc., radicals. The term "acyl" includes also aroyl groups such as the benzoyl radical or a substituted benzoyl radical, as, for example, a p-nitrobenzoyl, p-hydroxybenzoyl, etc., radical. Additionally, the term "acyl" is used herein to denote aralkanoyl groups, such as a phenyl acetic acid radical. Optionally, the acyl radical of the Formula Ia compounds can be a radical derived from a carboxylic acid which contains a basic group as, for example, a radical derived from a pyridine carboxylic acid.

The ethers of Formula Ia can be obtained by replacing the hydrogen atom of the hydroxyl group of a Formula I compound with an alkyl, alkenyl or alkynyl radical. Such radicals include, for example, lower alkyl groups having at least two carbon atoms such as ethyl, propyl, butyl, etc., radicals; lower alkenyl groups, such as allyl, propenyl, etc., radicals; and lower alkynyl groups, such as a propargyl radical.

Fluorine, chlorine and bromine atoms are examples of the halogen atoms which, in Formula I and Ia, are represented by the symbol $R_1$. The lower alkyl groups which, in Formulas I and Ia, are represented by the symbols $R_2$ and $R_3$ are, for example, methyl, ethyl, propyl, butyl, etc., radicals.

In the practice of the present invention, a compound having the formula:

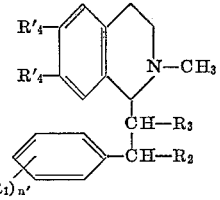

in which $n'$ is 0 or the integer 1, 2 or 3; $R_1$ is halogen; $R_2$ is hydrogen or a lower alkyl group; $R_3$ is hydrogen or a lower alkyl group; and in which one of the groups represented by the symbol $R'_4$ is a methoxy group, while the other group represented by the symbol $R'_4$ is a benzyloxy group; is reductively debenzylated. Where $n'$ is 0, the product thus obtained is nitrated. The debenzylated product can be converted subsequently into the corresponding ether, ester and/or salt.

The compounds of Formula II, which are used as the starting materials in the practice of the present invention, are prepared, for example, by condensing 3-benzyloxy-4-methoxy-phenethylamine or 3-methoxy-4-benzyloxy-phenethylamine with a nuclear halogen-substituted β-phenyl propionic acid. The latter compound can contain an alkyl group in the α- and/or β-position. The acid amide which is obtained by the reaction of the aforementioned amine and acid is cyclized to the corresponding 1-phenethyl-3,4-dihydroisoquinoline derivative and the latter compound is subsequently reduced with a suitable reducing agent such as an alkali metal-metal hydride, for example, sodium borohydride. The tetrahydroisoquinoline compound, which is produced in the previously described reduction step, is methylated, with methylation being effected, suitably, by treating the tetrahydroisoquinoline compound with formaldehyde and, subsequently, reducing the hydroxymethyl group thereof, for example, with Raney nickel catalyst in a hydrogen atmosphere. The starting compounds can be obtained also by quaternizing a 3,4-dihydroisoquinoline compound, which is obtained as described heretofore, for example, by treating said compound with methyl iodide, dimethyl sulfate, etc., and subsequently reducing said quaternary compound, for example, with an alkali metal hydride in a suitable solvent. Both of the substituted phenethylamines mentioned heretofore are known compounds which can be produced readily from vanillin or isovanillin.

The debenzylation step of the present process can be accomplished by reacting the compound of Formula II with hydrogen in the presence of a metal hydrogenation catalyst. Palladium, or a palladium-containing compound, such as palladium black, palladium on charcoal, etc., are well suited for use as the catalyst in this step. Furthermore, the debenzylation reaction is carried out conveniently in an inert solvent. As the solvent, one may use an alkanol, such as methanol, ethanol, etc., or glacial acetic acid. In a preferred procedure, the hydrogenation is carried out in glacial acetic acid using palladium on charcoal as the catalyst. The reaction is affected conveniently at an elevated temperature, for example, at a temperature within the range of from about 30° C. to about 70° C. Preferably, the reaction is carried out at a temperature of about 50° C.

In those cases where the starting material is a compound of Formula II in which the symbol $n'$ represents 0, the debenzylated product must subsequently be nitrated. This can be accomplished, for example, by reacting the debenzylated product with 100% nitric acid in glacial acetic acid at a low temperature. Purification of the thus obtained nitro compound can be accomplished by converting that compound into a salt by reaction with oxalic acid. The oxalate salt is obtained in crystalline form.

The debenzylated compounds of Formula I can be converted into the corresponding esters and ethers by methods known per se. For example, esters can be obtained by reacting the compounds of Formula I with acylating agents, such as carboxylic acids or anhydrides or halides thereof. Ethers can be obtained, for example, by reacting the compounds of Formula I with a diazoalkane, such as diazomethane, diazoethane, etc.; with a dialkyl sulfate, such as dimethyl sulfate; or with an alkyl halide, an alkenyl halide or an alkynyl halide.

The compounds of Formulas I, Ia and II in which the symbols $R_2$ and $R_3$ represent hydrogen, possess an asymmetric carbon atom. These compounds, therefore, can occur in the form of a racemic mixture or in the form of an optically active antipode. Where it is desired to obtain the compound of Formula I, or an ether or ester thereof, in the form of an optically active antipode, one may use, as the starting material in the present process, a compound of Formula II, either in the form of a racemic mixture or in the form of an optical active antipode. Where, however, the starting material employed is a racemic mixture, the desired compound of Formula I will be obtained in the form of a racemic mixture. Such racemic mixture can be resolved into its optically active antipodes. This can be undertaken at any time following the completion of the debenzylation reaction. The resolution of the racemic mixture is accomplished by methods known per se, for example, by fractional crystallization of the salts with an optically active acid, such as d-tartaric acid, dibenzoyl-d-tartaric acid, d-camphorsulfonic acid, etc.

The compounds of Formulas I, Ia and II, in which the symbols $R_2$ and/or $R_3$ represent an alkyl group possess two or three asymmetric carbon atoms. Accordingly, in the case of such compounds, the number of stereoisomeric racemates theoretically possible is 2 or 4. If these racemates form concurrently, they can be separated into the individual racemates by fractional crystallization or by chromatographic means. The racemic mixtures, in turn, can be separated into their optically active antipodes. The present invention encompasses all possible racemates and their optical antipodes as well as the production thereof.

The compounds of Formulas I and Ia are basic, generally crystalline, compounds. When reacted with conventional inorganic and organic acids, for example, with the hydrohalic acids, such as hydrochloric acid, hydrobromic acid, or with sulfuric acid, phosphoric acid, tartaric acid, citric acid, etc., these compounds form mostly crystalline, water-soluble salts.

The novel compounds of this invention possess interesting pharmacological properties. More particularly, the compounds of Formulas I and Ia have analgesic, spasmolytic and antitussive activity. Additionally, the compounds of the present invention have antirheumatic properties. As such, these compounds are useful as analgesic, spasmolytic, antitussive and antirheumatic agents.

The compounds of Formulas I and Ia can be used as medicines in the form of pharmaceutical preparations. These compounds, as well as their salts, can be employed as such or in admixture with other compounds and embodied in a form suitable for enteral and parenteral application. For example, the compounds of this invention can be used in admixture with inert organic and inorganic adjuvants, such as water, gelatin, lactose, starch, magnesium stearate, talc, vegetable oils, gums, polyalkylene glycols, Vaseline, etc. These pharmaceutical preparations can be provided in the form of tablets, dragees, suppositories, capsules, etc. Additionally, the present compounds can be provided in the form of liquid medicaments, for example, as solutions, suspensions or emulsions. If desired, these products can be sterilized and/or they can be mixed with adjuvant materials, such as preservatives, stabilizers, wetting or emulsifying agents, salts for altering osmotic pressure, buffers, etc. Additionally, the compounds of this invention can be used, if desired, in admixture with other therapeutically valuable materials.

For a fuller understanding of the nature and objects of this invention, reference may be had to the following examples which are given merely as further illustrations of the invention and are not to be construed in a limiting sense.

*Example 1*

In this example, 10.0 grams of 1-(4-chlorophenethyl)-2-methyl-6-benzyloxy-7-methoxy - 1,2,3,4 - tetrahydroisoquinoline were dissolved in 100 ml. of glacial acetic acid. After the addition of 1.5 grams of 5% palladium on charcoal thereto, the tetrahydroisoquinoline compound was hydrogenated by heating same in a hydrogen atmosphere at a temperature of about 50° C. When the requisite amount of hydrogen had been taken up, the catalyst was separated from the solution by filtration. The solution was then concentrated and the residue was made alkaline with dilute sodium hydroxide. The residue was subsequently shaken three times with chloroform, each time using 500 ml. of chloroform. The combined chloroform solutions were washed with water, dried over sodium sulfate and then concentrated. Upon treatment of the oily residue which remained with an excess of ethanolic hydrochloric acid, 1-(4-chlorophenethyl)-2-methyl-6-hydroxy-7-methoxy-1,2,3,4-tetrahydroisoquinoline precipitated in the form of its hydrochloric acid salt. Recrystallization of this product from alcohol-ether yielded crystals, slightly yellow in appearance, melting at a temperature of 234°–235° C.

The 1-(4-chlorophenethyl)-2-methyl - 6 - benzyloxy-7-methoxy-1,2,3,4-tetrahydroisoquinoline, which was used as the starting material in this example, was prepared as follows: 72.0 grams of β-(4-chlorophenyl)-propionic acid were heated to boiling with 100 grams of 3-benzyloxy-4-methoxy-phenethylamine in 750 ml. of xylol. This step was carried out in a round bottom flask fitted with a reflux condenser and water trap. Heating was continued for a period of about 15 hours. Upon cooling, a precipitate separated from the solution. This precipitate was recrystallized from ethyl acetate. There was obtained by this procedure about 145 grams of N-(3-benzyloxy-4-methoxyphenethyl)-β - (4 - chlorophenyl)-propionic acid amide in the form of colorless needles melting at a temperature of 153° C. 97.0 grams of the acid amide, prepared as described in the preceding paragraph, were dissolved in 500 ml. of absolute benzene and mixed with 42.1 ml. of phosphorus oxychloride. The mixture was maintained at a bath temperature of 100° C. for a period of about three hours. The solvent was thereafter removed by distillation at reduced pressure. The residue which remained was mixed with 500 ml. of water and the mixture was heated at its boiling point for 15 minutes. Thereafter, the mixture was cooled and made alkaline to phenolphthalein by the addition of 3 N sodium hydroxide. The precipitate, which separated from the mixture, was taken up in ether, the ether solution was washed with water until neutral, dried over sodium sulfate and concentrated. After sprinkling the residue with isopropyl ether, 1-(4-chlorophenethyl)-6-benzyloxy-7-methoxy-3,4-dihydroisoquinoline crystallized out. This compound was purified by recrystallization from a mixture of ether and petroleum ether mixture. The compound was thus obtained in the form of crystals, pale yellow in appearance, melting at a temperature of 108° C. The yield was about 70.0 grams.

50 grams of the dihydroisoquinoline compound, prepared as described in the preceding paragraph, were dissolved in 1 liter of ethanol and the solution, thus obtained, was mixed with 15.0 grams of sodium borohydride. The mixture was allowed to react for a period of two hours at room temperature and, subsequently, the mixture was heated for a period of one hour at reflux temperature. Thereafter, the solvent was removed by distillation and the residue which remained was taken up in ether. The ether solution was washed with water until neutral, dried over sodium sulfate and concentrated. The crystalline residue, thus obtained, was 1-(4-chlorophenethyl)-6-benzyloxy-7-methoxy-1,2,3,4-tetrahydroisoquinoline. After recrystallization of the compound two times from a mixture of acetone and petroleum ether, the tetrahydroisoquinoline compound, melting at a temperature of 89°–89.5° C., was obtained in a yield of 42.5 grams.

36.0 grams of the tetrahydroisoquinoline compound, prepared as described in the preceding paragraph, was dissolved in 1350 ml. of methanol. This solution was mixed with 9.0 ml. of 40% aqueous formaldehyde solution and the mixture was allowed to stand for a period of two hours at room temperature. The product was then hydrogenated using 10.0 grams of Raney nickel catalyst. When hydrogenation was complete, the catalyst was removed by filtration and the solvent was distilled off. The residue remaining after the distillation step was a pale yellow-colored oil which, for purification purposes, was chromatographed using a ten-fold amount of aluminum oxide (Activity II) using benzene as the eluting agent. By this procedure, there was obtained 1-(4-chlorophenethyl)-2-methyl-6-benzyloxy-7-methoxy-1,2,3,4-tetrahydroisoquinoline as a colorless oil, which after sprinkling with isopropyl ether, yielded crystals melting at a temperature of 75.6°–77° C.

Example 2

1-(4-chlorophenethyl)-2-methyl-6-methoxy-7-benzloxy-1,2,3,4-tetrahydroisoquinoline (melting point 83° C.) was subjected to reductive debenzylation by the procedure described in the first paragraph of Example 1. By such method, there was obtained 1-(4-chlorophenethyl)-2-methyl-6-methoxy-7-hydroxy-1,2,3,4-tetrahydroisoquinoline, the hydrochloride salt of which, after recrystallization from an alcohol-ether mixture, was obtained in the form of pale yellow-colored crystals melting at a temperature of 182°–183° C.

The starting material, namely, 1-(4-chlorophenethyl)-2-methyl-6-methoxy-7-benzyloxy-1,2,3,4-tetrahydroisoquinoline, which was used in this example was prepared by the same method described in Example 1 for the production of 1-(4-chlorophenethyl)-2-methyl-6-benzyloxy-7-methoxy-1,2,3,4-tetrahydroisoquinoline. The production of 1-(4-chlorophenethyl)-2-methyl-6-methoxy-7-benzyloxy-1,2,3,4-tetrahydroisoquinoline proceeded through the following-named intermediates:

(A) N-(3-methoxy-4-benzyloxyphenethyl)-β-(4-chlorophenyl)-propionic acid amide, melting at 134° C. (This compound was obtained by the reaction of β-(4-chlorophenyl)-propionic acid and 3-methoxy-4-benzyloxyphenethylamine.)

(B) 1-(4-chlorophenethyl)-6-methoxy-7-benzyloxy-3,4-dihydroisoquinoline, melting at a temperature of 98°–99° C.

(C) 1-(4-chlorophenethyl)-6-methoxy-7-benzyloxy-1,2,3,4-tetrahydroisoquinoline, melting at a temperature of 106° C.

(D) 1-(4-chlorophenethyl)-2-methyl-6-methoxy-7-benzyloxy-1,2,3,4-tetrahydroisoquinoline, melting at a temperature of 83° C.

Example 3

In this example, 5.0 grams of 1-(4-chlorophenethyl)-2-methyl-6-hydroxy-7-methoxy-1,2,3,4-tetrahydroisoquinoline were dissolved in 10 ml. of methanol. This solution was mixed, and reacted, with a solution containing an excess of diazoethane. When the reaction was complete, the reaction mixture was concentrated in a water-jet vacuum. The residue which remained was chromatographed using a ten-fold amount of aluminum oxide (Activity II neutral). Upon eluting with benzene and evaporating the solvent, 1-(4-chlorophenethyl)-2-methyl-6-ethoxy-7-methoxy-1,2,3,4-tetrahydroisoquinoline was obtained in the form of a colorless oil. The oxalate salt of this compound, recrystallized from a mixture of alcohol and ether, decomposed at a temperature of 105° C.

Example 4

In this example, 9.5 grams of 1-(4-chlorophenethyl)-2-methyl-6-methoxy-7-hydroxy-1,2,3,4-tetrahydroisoquinoline were treated with a mixture of 50 ml. of acetic anhydride and 50 ml. of pyridine and allowed to stand at room temperature for a period of 15 hours. At the end of that period of time, the solvent was evaporated off in a water-jet vacuum and the residue, thus obtained, was chromatographed using a ten-fold amount of aluminum oxide (Activity II). Upon eluting with benzene and, subsequently, evaporating the solvent, 1-(4-chlorophenethyl)-2-methyl-6-methoxy-7-acetoxy-1,2,3,4-tetrahydroisoquinoline was obtained in the form of a bright yellow-colored oil which proved to be homogeneous by thin-layer chromatography. In the 1R-spectrum, the acetate bands appeared at 5.69 and 8.5μ.

We claim:

1. A member selected from the group consisting of compounds of the formula:

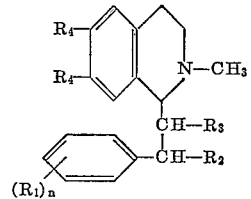

in which:

$R_1$ is selected from the group consisting of halogen and nitro;

$R_2$ is selected from the group consisting of hydrogen and lower alkyl;

$R_3$ is selected from the group consisting of hydrogen and lower alkyl;

$R_4$ is selected from the group consisting of hydroxy and methoxy with the proviso that one $R_4$ is hydroxy and the other $R_4$ is methoxy;

$n$ is an integer 1 to 3, inclusive, with the proviso that, where $n$ is the integer 2 to 3, inclusive, $R_1$ is halogen and acid addition salts of such compounds with medicinally acceptable acids.

2. 1-(4-chlorophenethyl)-2-methyl-6-hydroxy-7-methoxy-1,2,3,4-tetrahydroisoquinoline.

3. 1-(4-chlorophenethyl)-2-methyl-6-hydroxy-7-methoxy-1,2,3,4-tetrahydroisoquinoline hydrochloride.

4. 1-(4-chlorophenethyl)-2-methyl-6-methoxy-7-hydroxy-1,2,3,4-tetrahydroisoquinoline.

5. 1-(4-chlorophenethyl)-2-methyl-6-methoxy-7-hydroxy-1,2,3,4-tetrahydroisoquinoline hydrochloride.

6. 1-(4-chlorophenethyl)-2-methyl-6-methoxy-7-acetoxy-1,2,3,4-tetrahydroisoquinoline.

7. A compound of the formula:

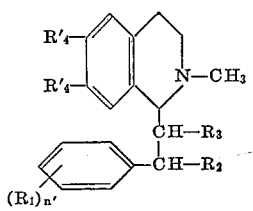

in which:
R₁ is halogen;
R₂ is selected from the group consisting of hydrogen and lower alkyl;
R₃ is selected from the group consisting of hydrogen and lower alkyl; wherein
R'₄ is selected from the group consisting of methoxy and benzyloxy with the proviso that one R'₄ is methoxy and the other is benzyloxy; and
n' is 0 to 3, inclusive.

8. 1 - (4 - chlorophenethyl) - 2-methyl-6-benzyloxy-7-methoxy-1,2,3,4-tetrahydroisoquinoline.

9. 1 - (4 - chlorophenethyl) - 2 - methyl-6-methoxy-7-benzyloxy-1,2,3,4-tetrahydroisoquinoline.

References Cited by the Examiner

UNITED STATES PATENTS

| 2,683,146 | 7/54 | Robinson | 260—286 |
| 2,995,557 | 8/61 | Brossi et al. | 260—289 |
| 3,067,203 | 12/62 | Besendorf et al. | 260—287 |

FOREIGN PATENTS 513,512  10/39  Great Britain.

OTHER REFERENCES

Bobbitt et al.; J. Org. Chem., volume 24, pages 1106–1108 (1959).

Brossi et al.: Helv. Chim. Acta., volume 43, pages 1459–72 (1960).

Kunitomo: J. Pharm. Soc. Jap., volume 81, pages 1253–7 (1961).

Sasaki et al.: Chem. Abstracts, volume 50, col. 8695–7 (1956).

Shepard et al.: J. Am. Chem. Soc., volume 72, pages 4364–8 (1950).

NICHOLAS S. RIZZO, *Primary Examiner.*